United States Patent [19]
Takahashi et al.

[11] Patent Number: 5,209,954
[45] Date of Patent: May 11, 1993

[54] METHOD FOR APPLYING A COATING LIQUID TO A WEB

[75] Inventors: Shinsuke Takahashi; Norio Shibata, both of Kanagawa, Japan

[73] Assignee: Fuji Photo Film Co., Ltd., Kanagawa, Japan

[21] Appl. No.: 899,592

[22] Filed: Jun. 18, 1992

Related U.S. Application Data

[63] Continuation of Ser. No. 636,470, Dec. 31, 1990, abandoned.

[30] Foreign Application Priority Data

Dec. 29, 1989 [JP] Japan .................. 1-340394

[51] Int. Cl.$^5$ .................. B05D 1/18; B05C 3/02
[52] U.S. Cl. .................. 427/430.1; 118/410; 118/419; 427/128
[58] Field of Search .......... 118/410, 419; 427/128, 427/356, 357, 358, 430.1

[56] References Cited

U.S. PATENT DOCUMENTS

| | | |
|---|---|---|
| 4,416,214 | 11/1983 | Tanaka et al. .......... 118/410 |
| 4,480,583 | 11/1984 | Tanaka et al. .......... 118/410 |
| 4,982,687 | 1/1991 | Takahashi et al. .......... 118/410 |

FOREIGN PATENT DOCUMENTS

| | | |
|---|---|---|
| 2038211 | 12/1979 | European Pat. Off. . |
| 1-180268 | 7/1989 | Japan . |
| 1-180269 | 7/1989 | Japan . |
| 1-180270 | 7/1989 | Japan . |

Primary Examiner—W. Gary Jones
Assistant Examiner—Brenda Lamb
Attorney, Agent, or Firm—Sughrue, Mion, Zinn, Macpeak & Seas

[57] ABSTRACT

A method for applying a coating liquid and a method for forming a coating liquid application device are taught. According to the method, a portion of an applied liquid supplied into a liquid reservoir is drained from one end thereof, and the other portion of the liquid is continuously discharged from the outlet portion of a slot which faces the surface of a flexible band-like carrier moving continuously so as to form a thin film of liquid on the surface. In this liquid application device, the diameter D of the reservoir, the width d of the slot, the depth $L_1$ of the slot from the reservoir to the outlet portion at the applied liquid supply end of the reservoir, the depth $L_2$ of the slot from the reservoir to the outlet portion at the applied liquid drain end of the reservoir, the length W of the outlet portion, the viscosity $\eta_p$ of the liquid in the reservoir, the viscosity $\eta_s$ of the liquid in the slot, the supplied quantity $Q_1$ of the liquid and the drained quantity $Q_2$ of the liquid are selected to comply with:

$$\left| \frac{\frac{12\eta_s}{d^3 W}(Q_1 - Q_2)(L_1 - L_2) - \frac{64\eta_p W}{D^4}(Q_1 + Q_2)}{\frac{6\eta_s}{d^3 W}(Q_1 - Q_2)(L_1 + L_2) + \frac{32\eta_p W}{D^4}(Q_1 + Q_2)} \right| \leq 0.05$$

6 Claims, 2 Drawing Sheets

METHOD FOR APPLYING A COATING LIQUID TO A WEB

This is a continuation of application Ser. No. 07/636,470, filed Dec. 31, 1990, now abandoned.

BACKGROUND OF THE INVENTION

The present invention relates to an application device, and more particularly to an improved application device for performing continuous application of a coating liquid for forming a magnetic recording layer on a flexible carrier.

A magnetic recording medium of the application type has been widely used in various fields of industry. To manufacture a magnetic recording medium of the application type, a coating liquid suitable for the application at hand is applied in a desired thickness to the surface of a continuously moving flexible nonmagnetic band-like carrier (hereinafter referred to as web), which is then dried. Such a recording medium manufacturing technique is very much different from a process of manufacturing a magnetic recording medium of the nonapplication type, which is manufactured through ion plating, sputtering, vacuum evaporative deposition or the like.

Most magnetic recording media which have been recently manufactured and sold for audio, video and data processing applications are of the application type, namely, manufactured using an application process such as a gravure process, a reverse roller process, a doctor blade process or an extrusion process. However, with these conventional application processes it is difficult to greatly enhance the productivity of the medium because there is a problem in the accuracy of application in such processes. For example, it is difficult to increase the speed of application since the thickness of the web is generally very small and the applied liquid for forming the ferromagnetic layer is thixotropic, which greatly affects the electromagnetic conversion property of the magnetic recording medium. As for an application process in which there are a relatively large number of places where stagnation can occur in the passage for the liquid for forming the ferromagnetic layer, an abnormal rise in the viscosity of the liquid or the cohesion thereof is likely to occur due to the thixotropy of the liquid, resulting in a large variation of the electromagnetic conversion property of the ferromagnetic layer. If the quantity of liquid discharged from the slot of the extruder of a conventional extrusion-type application device is decreased, the liquid is likely to cohere in a plane opposite the liquid supply nozzle through which the liquid is supplied into the liquid reservoir of the extruder. The cohesion of the liquid results in the formation of a large number of longitudinal streaks in the layer of the liquid applied to the web. On the other hand, if the quantity of the applied liquid discharged from the slot of the extruder is increased, the number of such longitudinal streaks decreases, but a color nonuniformity (a thickness nonuniformity) in the layer of the liquid applied to the web tends to occur and spread over the entire width of the layer. What causes the longitudinal streaks and the color nonuniformity has been found to be that speed of the flow of the liquid in the longitudinal direction of the extruder greatly affects the thixotropy of the liquid. More specifically, it has been determined that the viscosity of the liquid near the liquid supply nozzle, where the speed of the liquid is relatively high, is likely to drop due to a shearing action so as to cause the color nonuniformity. The flow velocity of the portion of the liquid opposite the supply nozzle drops to nearly zero, making the liquid likely to cohere and cause longitudinal streaking.

As a result of this determination, an improved application method was proposed, as disclosed in the Japanese Patent Application No. 53674/85. In accordance with this method, an applied liquid is continuously discharged from the outlet portion of a slot facing the surface of a continuously moving web so as to form a thin film of the applied liquid on the surface of the web. The method is characterized in that the quantity of liquid supplied to the liquid reservoir of the extruder which communicates with the slot is made larger than that of the liquid actually applied to the web, and a portion of the liquid in the reservoir is caused to flow out not through the slot but from a portion of the reservoir located farthest or nearly farthest from the liquid supply nozzle for the reservoir along the width of the web.

Another application method in which a liquid portion supplied separately from liquid supplied to the reservoir is forcibly extracted has been disclosed in Japanese Patent Application (OPI) No. 236968/89 (the term "OPI" as used herein means an "unexamined published application"). As for these methods, the numbers of longitudinal streaks and color nonuniformities have been much reduced in comparison with the prior practice so as to improve the electromagnetic conversion property of ferromagnetic layers formed using such methods.

An application device including an extrusion-type application head designed in accordance with the formula indicated below has been disclosed in Japanese Patent Application (OPI) No. 180266/89:

$$\frac{16t^3L^3Q_1}{3\pi D^4S(Q_1 - Q_2)} \leq 0.005$$

In the formula, $Q_1-Q_2$, t, S, L and D denote the applied quantity of a liquid, the width of a slot, the length of the slot, the depth of the slot, and the diameter of a liquid reservoir, respectively. However, according to the formula, it is necessary in reality to make the length S of the slot very large or make the width t of the slot very small. If the length of the slot is made very large, the size of the discharge portion of the application device is very large. If the width of the slot is made small, foreign matter is very likely to be trapped in the slot to cause a very large number of longitudinal streaks in the film of applied liquid. Therefore, the device is not practical is use. Although the formula is based on the supposition that the applied liquid forms a Poiseuille flow in the reservoir, the actual applied liquid is a very non-Newtonian one whose apparent viscosity affects the physical properties of the liquid and depends on the flow of the liquid itself. Since the apparent viscosity of the liquid changes in the liquid reservoir and the slot, the thickness of the film of the applied liquid can be made uniform by selecting the dimensions of portions of the device.

The density of recording in magnetic recording media has become higher and higher in recent years. As a result, the media have been required to be higher in quality than prior ones. Therefore, an extrusion-type application device by which a very high effect is produced in consideration of the thixotropy of the applied liquid at the time of the application thereof has been desired.

SUMMARY OF THE INVENTION

The present invention was made in order to solve the problems mentioned above. Accordingly, it is an object of the present invention to provide an application device which functions so that the occurrence of color nonuniformity and longitudinal streaking is effectively suppressed to allow the formation of an applied liquid film of higher quality than can be obtained by a conventional application device so as to manufacture a magnetic recording medium of good electromagnetic conversion property.

In an application device provided in accordance with the present invention, a portion of the applied liquid supplied into a liquid reservoir is drained from one end thereof, and the other portion of the liquid is continuously discharged from the outlet portion of a slot which faces the surface of a flexible band-like carrier moving continuously so that a thin film of the liquid is formed on the surface of the carrier. The device is characterized in that the diameter D of the reservoir, the width d of the slot, the depth $L_1$ of the slot from the reservoir to the outlet portion of the slot at the applied liquid supply end of the reservoir, the depth $L_2$ of the slot from the reservoir to the outlet portion of the slot at the applied liquid drain end of the reservoir, the length W of the outlet, the viscosity $\eta_p$ of the liquid in the reservoir, the viscosity $\eta_s$ of the liquid in the slot, the supplied quantity $Q_1$ of the liquid and drained quantity $Q_2$ of the liquid are selected to comply with the following formula:

$$\left| \frac{\frac{12\eta_s}{d^3 W}(Q_1 - Q_2)(L_1 - L_2) - \frac{64\eta_p W}{D^4}(Q_1 + Q_2)}{\frac{6\eta_s}{d^3 W}(Q_1 - Q_2)(L_1 + L_2) + \frac{32\eta_p W}{D^4}(Q_1 + Q_2)} \right| \leq 0.05$$

DESCRIPTION OF THE PREFERRED EMBODIMENTS

Preferred embodiments of the present invention are hereafter described with reference to the drawings attached hereto.

Figure 1:
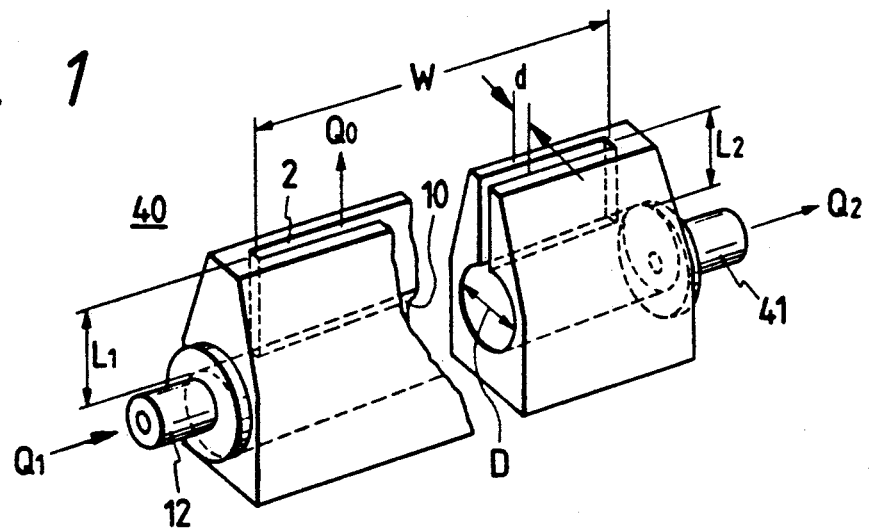
FIG. 1 is a perspective view of a major part of an application device constructed according to a preferred embodiment of the present invention.
Figure 2:
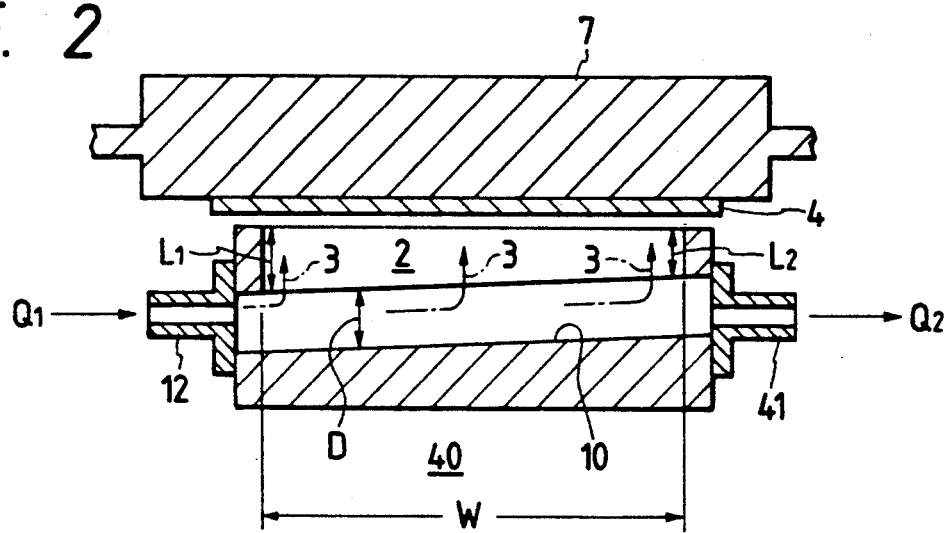
FIG. 2 is a sectional view of the part shown in FIG. 1.

FIGS. 1 and 2 show the extruder 40 of an application device of a first preferred embodiment of the invention. The outlet portion of slot 2 of the extruder 40 upwardly faces the surface of a web 4 which is moved at a fixed speed while being supported by a backing roller 7. The gap between the outlet portion of the slot 2 and the surface of the web 4 is usually 2 mm to 150 mm. An applied liquid 3 is continuously supplied, under pressure, into the liquid reservoir 10 of the extruder 40 through a liquid supply nozzle 12 so that the supplied quantity $Q_1$ of the liquid is larger than the applied quantity $Q_0$ thereof to the surface of the web 4. As a result, the reservoir 10 is filled with the liquid 3 so that the distribution of the pressure of the liquid is not precisely uniform along the width of the web 4, but such that the pressure gradually falls toward a liquid drain nozzle 41 provided at one end of the extruder in opposition to the liquid supply nozzle 12, namely, located farthest of all the portions of the liquid supply nozzle along the width of the web 4. The excess portion of the supplied liquid 3 is extracted from the reservoir 10 through the drain nozzle 41 by an extraction pump $P_2$. As a result, it is made somewhat less likely that the liquid 3 coheres in the extruder 40 and the distribution of the pressure of the liquid in the reservoir 10 is made nonuniform. In addition, according to the present invention, the depth of the slot 2, which is formed in the reservoir 10 to the top of the extruder 40, is gradually decreased from the liquid supply end of the reservoir toward the liquid drain end thereof, and the dimensions of the portions of the extruder are selected to comply with the following formula (1):

$$\left| \frac{\frac{12\eta_s}{d^3 W}(Q_1 - Q_2)(L_1 - L_2) - \frac{64\eta_p W}{D^4}(Q_1 + Q_2)}{\frac{6\eta_s}{d^3 W}(Q_1 - Q_2)(L_1 + L_2) + \frac{32\eta_p W}{D^4}(Q_1 + Q_2)} \right| \leq 0.05$$

In the formula, D, d, $L_1$, $L_2$, W, $\eta_p$ and $\eta_s$ denote the diameter of the reservoir 10, the width of the slot 2, the depth of the slot at the liquid supply end of the reservoir, the depth of the slot at the liquid drain end of the reservoir, the length of the outlet portion of the slot, the viscosity of the liquid 3 in the reservoir, and the viscosity of the liquid in the slot, respectively.

The viscosity $\eta$ of the applied liquid 3 produced by dispersing a magnetic substance and carbon black in a solvent can be expressed by the Casson equation proposed by N. Casson, as follows:

$$\eta = \frac{(a + b \cdot \gamma^{0.5})^2}{\gamma}$$

In the equation, $\gamma$ denotes the shearing speed of the liquid 3. For the shearing speed $\gamma_p$ of the liquid 3 in the reservoir 10, the profile of velocity in a laminar flow or a perfectly developed flow in a tube of circular cross section is supposed as a model herein. The velocity u of the flow of the liquid at an arbitrary point located at a distance of r from the center of the tube is expressed as follows:

$$u = \frac{2Q(R^2 - r^2)}{\pi R^4}$$

In the equation, Q and R denote the flow rate of the liquid and the radius of the tube, respectively. The shearing speed $\gamma_p$ is expressed as follows:

$$\gamma_p = \frac{\delta u}{\delta r} = \frac{4Qr}{\pi R^4}$$

Since the distance R is equal to the radius R of the tube if the point is on the inside surface of the tube, the shearing speed $\gamma_p$ is expressed as follows:

$$\gamma_p = \frac{4Q}{\pi R^3} = \frac{32Q}{\pi D^3}$$

The shearing speed $\gamma_p$ of the reservoir can thus be expressed by the diameter D of the reservoir and the flow rate of the liquid therein.

Since the width of the slot 2 is very small, the distribution of the flow speed of the liquid 3 therein, which is shaped as an isosceles triangle whose vertex is on the center of the length of the slot, can be supposed as a model for the shearing speed $\gamma_s$ of the liquid in the slot. The velocity u of the liquid at an arbitrary point located at a distance of y from the center of the length of the slot is expressed as follows:

$$u = \frac{4q}{Wd^2}(d/2 - y)$$

$$\gamma_s = \frac{\delta u}{\delta y} = \frac{4q}{Wd^2}$$

In the above equations q denotes the applied quantity $Q_1 - Q_2$ of the liquid 3.

Figure 5:
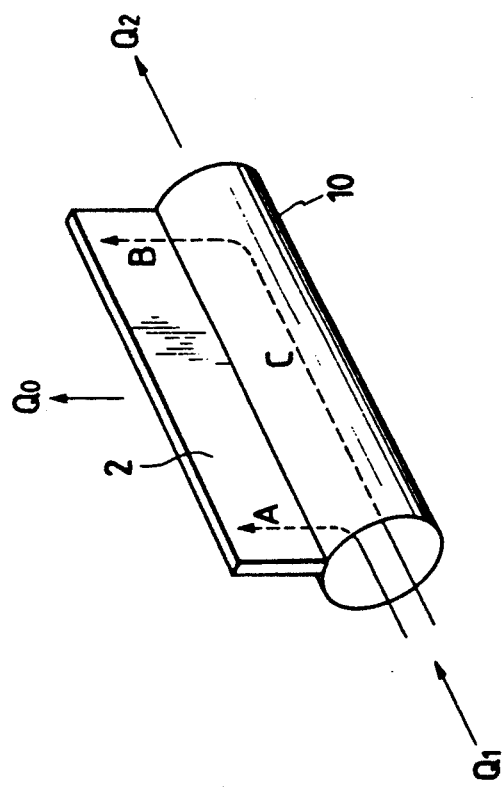
FIG. 5 is a simplified view of the extruder of the device shown in FIG. 1, and indicates a model for flow passages in the slot and reservoir of the extruder.

A basic concept of the present invention is that the distribution of the discharged quantity of the applied liquid 3 is made uniform in consideration of the pressure loss difference which arises in the passing of the liquid through the respective passages in the extruder 40. This concept will now be described in more detail, with reference to a flow passage model shown in FIG. 5.

Passages A and C+B are based on the model. The nonuniformity of the distribution of the discharged quantity of the liquid is calculated in the form of the absolute value of the ratio of the difference between the pressure losses in the passages A and C+B to the mean value of the pressure losses. The absolute value of the ratio is expressed as follows:

$$\left| \frac{A - (C + B)}{[A + (C + B)] \cdot (\frac{1}{2})} \right| \quad (2)$$

where, $$A = \frac{12\eta}{d^3 W}(Q_1 - Q_2) \times L_1$$

$$B = \frac{12\eta}{d^3 W}(Q_1 - Q_2) \times L_2$$

$$C = \frac{128\eta W}{\pi D^4} \cdot \frac{(Q_1 + Q_2)}{2}$$

Formula (1) can be obtained by substituting the term (2) with the equations for the passages A, B, and C. Since it is known that an applied liquid film of high quality is obtained if the ratio of the variation in the thickness of the film is set within about ±5%, the allowable value for formula (1) is set at ±5%. Since the extruder 40 is constituted to comply with formula (1), the accuracy of the application of the liquid 3 to the web 4 by the device is very high.

Figure 4:
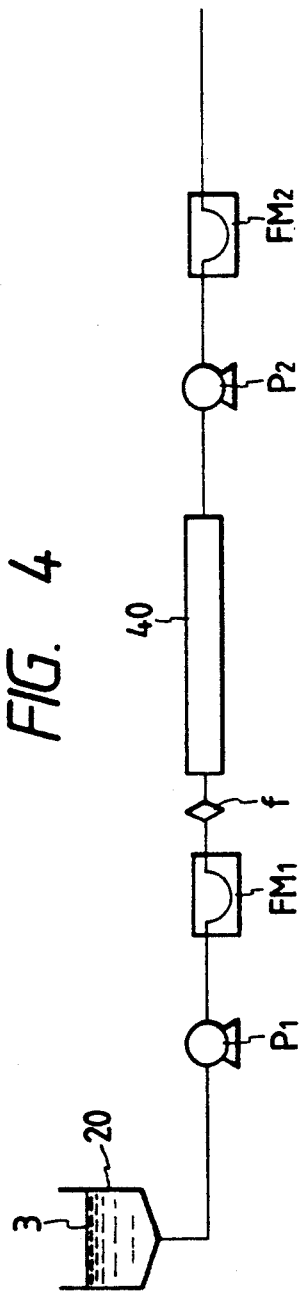
FIG. 4 is a schematic view of each of the devices.

FIG. 4 shows the liquid supply line of the application device including the extruder 40 constituted as mentioned above. The liquid 3 stored in a storage tank 20 is pumped out therefrom to the extruder 40 by a feed pump $P_1$ through a filter f, while the pumped quantity of the liquid is measured by a flow meter $FM_1$. At the same time, a portion of the liquid 3 in the extruder 40 is extracted therefrom through the drain nozzle 41 by the extraction pump $P_2$ provided separately from the liquid supply line of the device, and the quantity of this portion is measured by a flow meter $FM_2$. Therefore, the quantity $Q_0$ of the liquid 3 which flows out from the slot 2 and is applied to the surface of the web 4 is equal to the difference $Q_1 - Q_2$ between the flow rates measured by the flow meters $FM_1$ and $FM_2$.

It is preferable that the feed pump $P_1$ and the extraction pump $P_2$ move 3 smoothly and stably. The pumps may be of any type. A liquid circulation pump or another type of liquid moving device may be provided instead of the extraction pump $P_2$ as far as the circulation pump or the liquid moving device functions to extract the liquid 3 from the reservoir 10 through the drain nozzle 41.

The quantity of the liquid 3 discharged from the slot 2 of the extruder 40 can be finely regulated by setting the feed pump $P_1$ and the extraction pump $P_2$. Moreover, not only is it easy to control the speed of flow of the liquid 3 in the reservoir 10, but also the depth of the slot 2 at the liquid supply end of the reservoir can be made appropriately different from that of the slot at the liquid drain end of the reservoir. This allows the resistance to the outflow of the liquid 3 from the slot to be set to compensate for changes in the pressure of the liquid in the reservoir so that the distribution of the outflow quantity of the liquid 3, which flows out from the slot, is kept uniform along the length of the slot. As a result, the application of the liquid 3 to the web 4 by the device is uniform along the length of the slot, even if the width of the film of the liquid on the web is increased. This cannot be achieved in the conventional art.

The present invention is not confined to the embodiment described above. For example, the invention may be embodied as an application device including an extruder 60 shown in FIG. 3. The extruder 60 is different from the preceding one 40 in the position of a liquid supply nozzle 62 and the form of a liquid reservoir 61 whose bottom is above the central portion of the reservoir with respect to both ends thereof. The extruder 60 is of the center supply type in which the liquid supply nozzle 62 is located nearly at the center of the extruder. Longitudinal streaks and color nonuniformities are less likely to occur with the extruder 60 of the center supply type than with the extruder 40 of the lateral supply type. Longitudinal streaks and color nonuniformities, which cause the electromagnetic conversion property of a magnetic recording medium to be nonuniform, are more likely to occur at the central portion and at both ends of the liquid reservoir 61 due to the physical properties of the applied liquid 3. However, liquid drain nozzles 63 and 64 are provided at both the ends of the liquid reservoir 61 to cause the liquid 3 to partly flow out through the drain nozzles, and the top of the reservoir is above the central portion thereof relative to both the ends thereof as well as the bottom thereof to decrease the depth of the slot 2a of the extruder 60 from the central portion of the slot toward both the ends thereof. For this reason, longitudinal streaks and color nonuniformities are less likely to occur with the extruder 60 as well as with the previously described extruder 40, so that the film of the liquid 3 applied to a web by the application device is uniform in quality.

Figure 3:
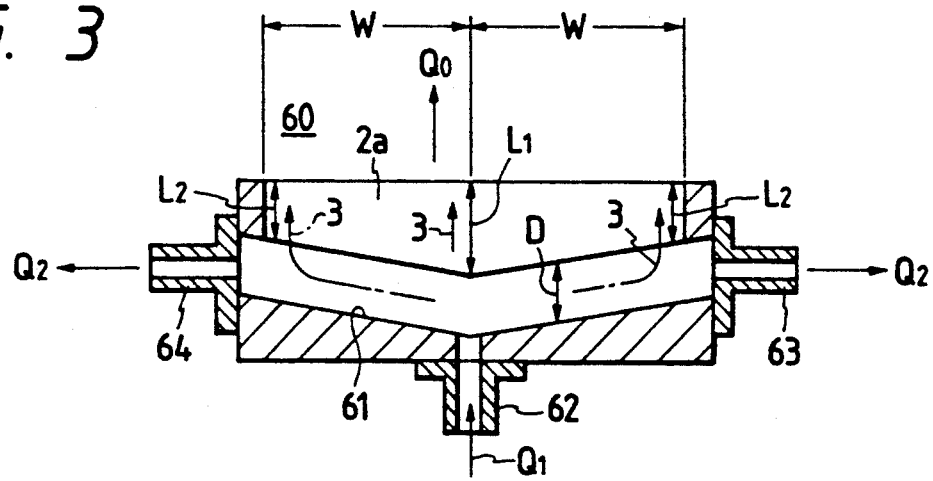
FIG. 3 is a sectional view of a major part of an application device of another embodiment of the invention.

The liquid drain nozzles 41, 63 and 64 may be replaced by liquid passages extending into the reservoirs 10 and 61 near the ends thereof. Although FIGS. 1, 2 and 3 show the extruders 40 and 60 arranged so that the slots thereof are located over the reservoirs thereof, the extruders may be arranged so that the slots thereof are located under the reservoirs and downwardly face the webs, if necessary. Also, the present invention may be embodied so that a backing roller is not provided, a web is located in contact with the slot portion of the extruder before the start of application, and a desired gap is formed between the web and the slot portion of the extruder by the discharge pressure of an applied liquid after the start of application.

In an application device provided in accordance with the present invention, the depth of a slot, which extends from a liquid reservoir to the outlet portion of the slot, is decreased from the applied liquid supply end of the reservoir toward the applied liquid drain end thereof, and the diameter of the reservoir, the width and length of the slot, etc., are set in accordance with a formula established in consideration of factors such as the viscosity $\eta_p$ of the applied liquid in the reservoir and that $\eta_s$ of the liquid in the slot, which are very important in actual application. For this reason, the difference in the pressure of the applied liquid in the reservoir does not affect the distribution of the discharged quantity of the applied liquid, for example, because of the alteration of the depth of the slot, and application devices optimal for applied liquids differing from each other in physical properties can be provided. Thus, the thickness of the film of the applied liquid on a web is made more stable over the entire surface of the web with the application device of the invention than with a conventional one, and the accuracy of the application by the former is high enough not to cause longitudinal streaks and color nonuniformities.

The novel effects of the present invention are hereafter clarified by actual examples thereof and comparative examples.

Substances shown in Table 1 were put in a ball mill and well mixed and dispersed together. 30 parts by weight of an epoxy resin of 500 in epoxy equivalent were added to the mixture of the substances and uniformly mixed therewith so that a magnetic liquid (magnetic dispersion liquid) to be applied to a web was produced.

TABLE 1

| | |
|---|---|
| Powder of $\gamma$-$Fe_2O_3$ (spicular grains of 0.5 $\mu$m in mean major diameter and 320 Oe in coercive force) | 300 parts by weight |
| Copolymer of vinyl chloride and vinyl chloride (87:13 in copolymerization ratio and 400 in polymerization degree) | 30 parts by weight |

TABLE 1-continued

| | |
|---|---|
| Electroconductive carbon | 20 parts by weight |
| Polyamide resin (300 in amine value) | 15 parts by weight |
| Lecithin | 6 parts by weight |
| Silicone oil (dimethyl polysiloxane) | 3 parts by weight |
| Xylol | 300 parts by weight |
| Methyl isobutyl ketone | 300 parts by weight |
| N-butanol | 100 parts by weight |

When the equilibrium viscosity of the magnetic liquid was measured with the Shimazu Rheometer RM-1 manufactured by Shimazu Corporation, the reading thereof was 7 poise at the shearing speed of 10 sec$^{-1}$. Seven kinds of application devices having extruders 40 having a basic construction as shown in FIGS. 1, 2 and 4 were used to apply the magnetic liquid to a web as the supplied and extracted quantities of the liquid were altered, so that specimens Nos. 1, 2, 3, 4, 5, 6, 7, 8, 9 and 10 were produced. Table 2 shows the conditions of application. Table 3 shows the states of films of the applied liquid.

TABLE 2

| | |
|---|---|
| Thickness of dried film ($\mu$m) | 5 |
| Thickness of web ($\mu$m) | 20 |
| Width of web (mm) | 100 |
| Speed of application (m/min) | 100 |
| Gap between web and slot (mm) | 3 |
| Direction of discharge from slot | Vertical |
| Quantity $Q_1$ of supplied liquid (l/min) | 8 |
| Quantity $Q_0$ of supplied liquid (l/min) | 4 |
| Quantity $Q_2$ of supplied liquid (l/min) | 4 |

TABLE 3

| Specimen No. | Supplied liquid quantity (g/min) | Extracted liquid quantity (g/min) | Slot depth $L_1$ (mm) | Slot depth $L_2$ (mm) | Slot width (mm) | Reservoir diameter (mm) | Film thickness nonuniformity ratio | Evaluation |
|---|---|---|---|---|---|---|---|---|
| 1 | 3,000 | 1,000 | 60 | 50 | 0.3 | 12 | 0.014 | good |
| 2 | " | " | " | 60 | " | " | 0.073 | bad |
| 3 | 12,000 | 1,000 | 60 | 50 | 0.3 | 12 | 0.036 | good |
| 4 | " | " | " | " | " | 14 | 0.051 | fair |
| 5 | 8,000 | 1,000 | 60 | 50 | 0.5 | 15 | 0.040 | good |
| 6 | " | " | " | " | 0.3 | " | 0.044 | good |
| 7 | " | " | " | " | 0.2 | " | 0.072 | bad |
| 8 | " | " | " | " | 0.15 | " | 0.084 | bad |
| 9 | 6,000 | 1,000 | 60 | 50 | 0.15 | 5 | 0.035 | good |
| 10 | 4,000 | " | " | " | " | " | 0.062 | bad |

To measure the mean thickness of each of the films of the applied liquid, a contact-type film thickness meter E-M43K (Minicom) manufactured by Tokyo Seimitsu Corporation was used. The thickness of each specimen was measured, the film was thereafter removed from the web with a solvent, and the thickness of the web was then measured. The difference between the thickness of the specimen and that of the web was determined as the thickness of the film. Such measurement was performed at ten and several points along the width of the web and four points every two meters along the web, namely, at scores of points in all, so that the mean thickness of each of the films was determined. Observation was manually performed to check whether longitudinal streaking of the film occurred.

It is understood from Table 3 that stable application can be always performed by the application devices according to the present invention, despite variations in the thickness of the films and the occurrence of longitudinal streaking.

What is claimed is:

1. A method for applying a coating liquid onto a web, comprising the steps of:

selecting a coating liquid;
forming a liquid reservoir and a slot with an outlet portion in accordance with the formula:

$$\left| \frac{\frac{12\eta_s}{d^3 W}(Q_1 - Q_2)(L_1 - L_2) - \frac{64\eta_p W}{D^4}(Q_1 + Q_2)}{\frac{6\eta_s}{d^3 W}(Q_1 - Q_2)(L_1 + L_2) + \frac{32\eta_p W}{D^4}(Q_1 + Q_2)} \right| \leq 0.05$$

wherein D is the internal diameter of the liquid reservoir, d is the internal width of the slot, $L_1$ is the internal depth of the slot from the reservoir to the outlet portion at a liquid supply location of the reservoir, $L_2$ is the internal depth of the slot from the reservoir to the outlet portion at a liquid drain location of the reservoir, W is the internal length of the outlet portion, $\eta_p$ is the viscosity of the liquid while flowing through the reservoir, $\eta_s$ is the viscosity of the liquid while flowing through the slot, $Q_1$ is the quantity of the liquid supplied to the reservoir at the liquid supply location, and $Q_2$ is the quantity of the liquid drained from the reservoir at the liquid drain location;

supplying the quantity $Q_1$ of the liquid to the reservoir;

draining the quantity $Q_2$ of the liquid from the reservoir, the quantity $Q_2$ being less than the quantity $Q_1$;

feeding the remaining quantity of the liquid through the slot to the outlet portion; and continuously moving a surface of the web along the outlet portion of the slot while discharging the remaining quantity of the liquid from the outlet portion of the slot onto the surface of the web, so as to form a film of the liquid on the surface.

2. A method according to claim 1, wherein the quantity $Q_1$ of the liquid is supplied to the reservoir at an inlet provided at a first end of the reservoir, and the quantity $Q_2$ of the liquid is drained at an outlet provided at a second end of the reservoir.

3. A method according to claim 1, wherein the quantity $Q_2$ of the liquid is supplied to the reservoir at a center portion of the reservoir, and the quantity $Q_2$ of the liquid is drained at a plurality of outlets provided at end portions of the reservoir.

4. A method for forming a coating liquid application device for applying a coating liquid, comprising the steps of:

forming an extruder having a liquid reservoir and a slot connected with the reservoir, the slot having an outlet portion and the extruder being formed to satisfy the formula:

$$\left| \frac{\frac{12\eta_s}{d^3 W}(Q_1 - Q_2)(L_1 - L_2) - \frac{64\eta_p W}{D^4}(Q_1 + Q_2)}{\frac{6\eta_s}{d^3 W}(Q_1 - Q_2)(L_1 + L_2) + \frac{32\eta_p W}{D^4}(Q_1 + Q_2)} \right| \leq 0.05$$

wherein D is the internal diameter of the liquid reservoir, d is the internal width of the slot, $L_1$ is the internal depth of the slot from the reservoir to the outlet portion at a liquid supply location of the reservoir, $L_2$ is the internal depth of the slot from the reservoir to the outlet portion at a liquid drain location of the reservoir, W is the internal length of the outlet portion, $\eta_p$ is the viscosity of the liquid while flowing through the reservoir, $\eta_s$ is the victory of the liquid while flowing through the slot, $Q_1$ is the quantity of the liquid supplied to the reservoir at the liquid supply location, and $Q_2$ is the quantity of the liquid drained from the reservoir at the liquid drain location;

providing the reservoir with a liquid supply inlet at a first location; and providing the reservoir with a liquid drain inlet at a second location.

5. A method according to claim 4, wherein the first location is a first end of the reservoir, and the second location is a second end of the reservoir.

6. A method according to claim 4, wherein the first location is a center portion of the reservoir, and the second location is a first end portion and a second end portion of the reservoir.

* * * * *